United States Patent [19]
Wentworth, Jr.

[11] 3,731,595
[45] May 8, 1973

[54] CYLINDRICAL BELLOWS SEAL FOR EXTENSIVE AXIAL MOVEMENT
[75] Inventor: Robert Seabury Wentworth, Jr., Wilmington, Calif.
[73] Assignee: Borg-Warner Corporation, Chicago, Ill.
[22] Filed: Dec. 1, 1971
[21] Appl. No.: 203,620

[52] U.S. Cl. ..............................92/37, 92/43, 92/44, 74/18
[51] Int. Cl. ............................F01b 19/00, F16j 3/00
[58] Field of Search........................92/34, 37, 39, 43, 92/44, 89; 74/18

[56] References Cited

UNITED STATES PATENTS

| R23,723 | 10/1953 | Allwein | 92/37 X |
| 2,637,301 | 5/1953 | Burdick | 92/39 X |
| 3,014,460 | 12/1961 | Randol | 92/39 X |
| 3,166,658 | 1/1965 | Jennings | 92/34 X |
| 3,229,067 | 1/1966 | Schockelt | 200/148 |
| 3,643,496 | 2/1972 | Zajic | 92/37 X |

FOREIGN PATENTS OR APPLICATIONS 1,112,743  3/1956  France ......................................92/34

Primary Examiner—Martin P. Schwadron
Assistant Examiner—A. Hershkovitz
Attorney—William S. McCurry et al.

[57] ABSTRACT

A composite cylindrical bellows seal including a plurality of cylindrical bellows seal segments each hermetically connected at each axial end to respective annular limit discs. Certain of the limit discs are commonly connected between two adjacent bellows segments to form the composite bellows seal. Limit rods are connected between the limit discs in a manner permitting unrestrained contraction of each bellows segment while limiting the expansion of each bellows segment to within an appropriate limit selected for the respective bellows segment. The limit disc at one end of the composite seal is adapted to be hermetically connected to a movable actuator rod or shaft and the limit disc at the other end of the composite seal is adapted to be connected to the housing or body which receives the actuator rod.

10 Claims, 9 Drawing Figures

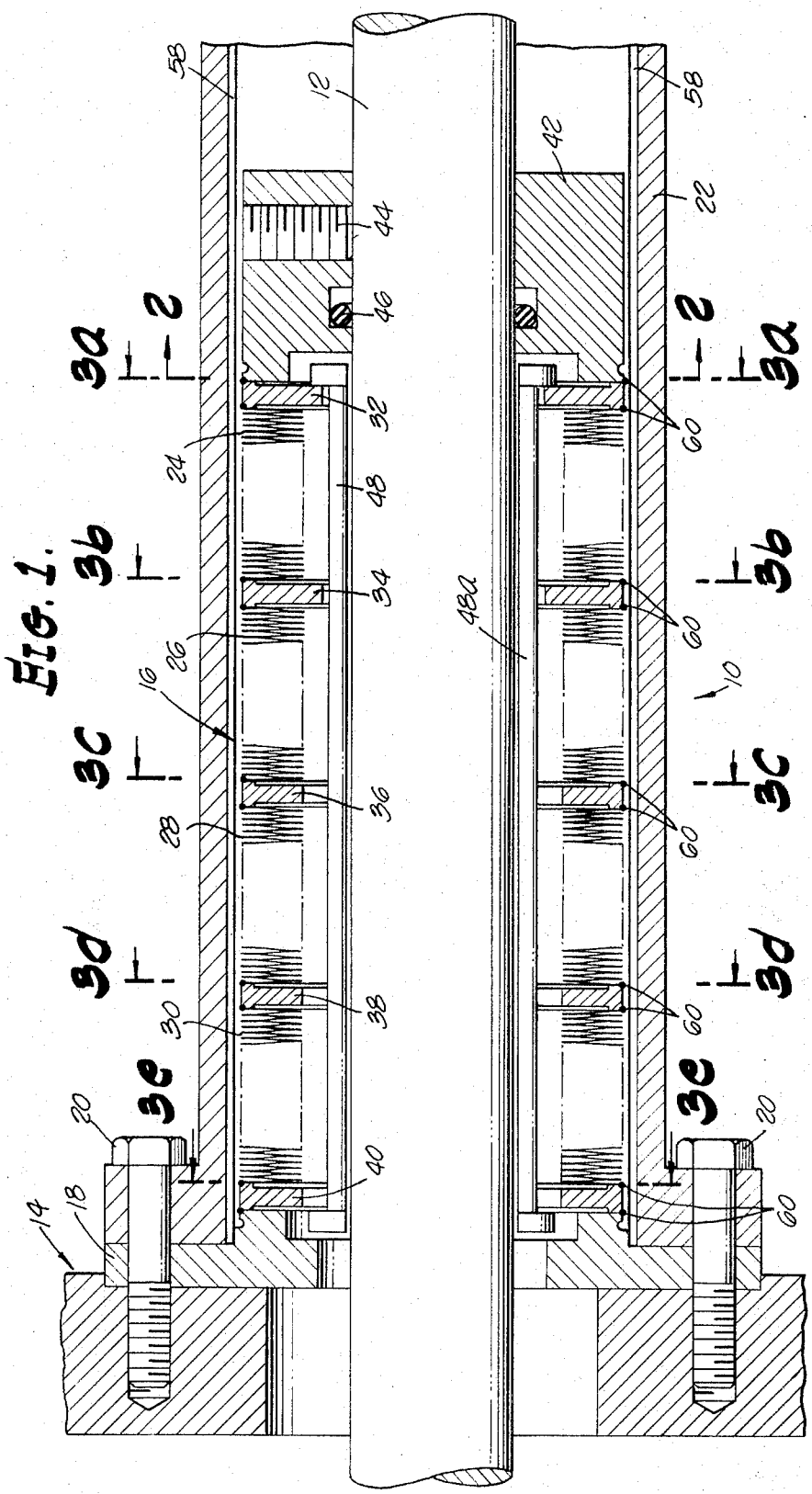

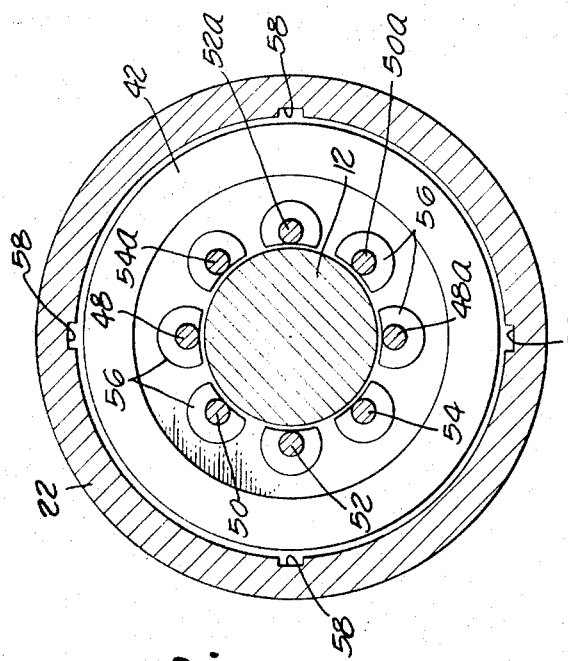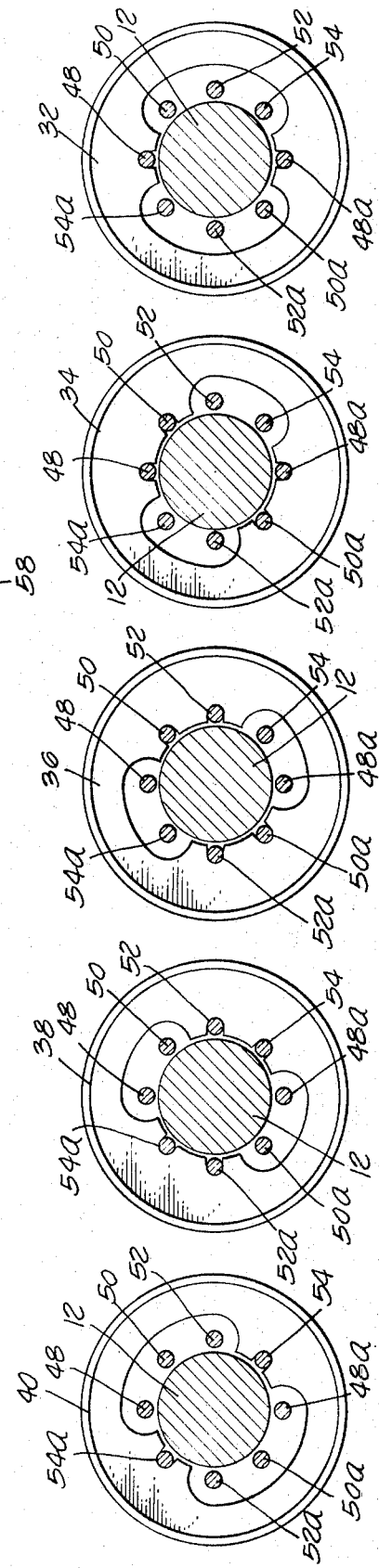

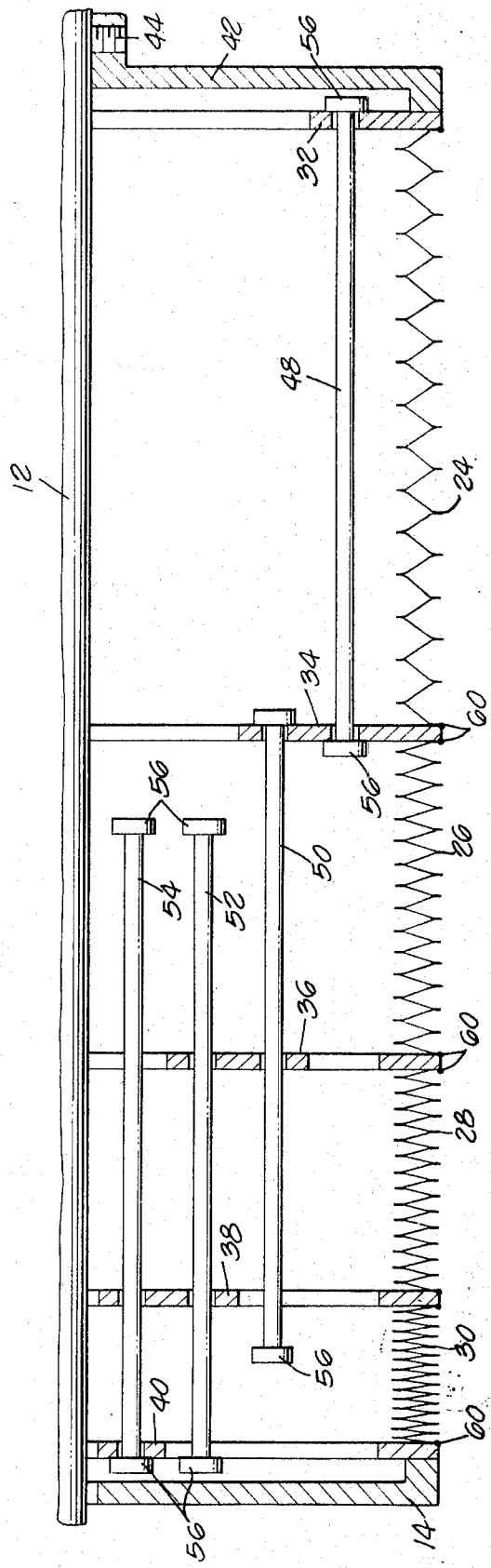

3,731,595

CYLINDRICAL BELLOWS SEAL FOR EXTENSIVE AXIAL MOVEMENT

BACKGROUND OF THE INVENTION

This invention generally relates to fluid tight seals for reciprocable actuator rods or shafts and more particularly relates to a hermetic composite cylindrical bellows seal suitable to effect a positive fluid tight seal between a housing and an actuator shaft which has extensive axial movement into and out of the housing.

In many installations employing axially movable actuating rods fluids including liquids or gases must scrupulously be contained. Such fluids may be corrosive, highly inflammable, poisonous, superheated or otherwise noxious to the environment needing protection or isolation. Bellows type seals are readily adapted to provide hermetic seals of the kind desired for such installations. However, bellows have weight, depending on the size of the bellows and the material used to form the bellows, which causes undesirable deformation or disproportionate convolution of the bellows if placed in a vertical installation and which gives adverse inertial effects in any position when the bellows is employed to seal an actuating rod which must axially move at a very fast rate. To provide a seal for an actuating rod or shaft having extensive axial movement, a suitable bellows seal must necessarily be long enough to provide the necessary seal while accommodating the travel of the rod, which travel, for example, may be in order of 0.5 to 1.5 meters or more. Such a long bellows seal will of course be substantially more susceptible to the undesirable weight and inertial effects to the point of failure or of being inoperable.

Accordingly, an object of this invention is to provide a bellows seal suitable for extensive and rapid axial movement.

Another object of this invention is to provide a seal which is hermetic.

A further object of this invention is to provide a seal which may be fabricated of materials impervious to corrosive solvents, high temperatures and the like.

SUMMARY OF THE INVENTION

The foregoing and other objects and advantages are attained in a composite cylindrical bellows seal including a plurality of cylindrical bellows seal segments each hermetically connected at each axial end to respective annular limit discs. Certain of the limit discs are commonly connected between two adjacent bellows segments to form the composite bellows seal. Limit rods are connected between the limit discs and along the axis of each respective bellows segment in a manner permitting unrestrained contraction of each bellows segment while limiting the expansion of each bellows segment to within an appropriate limit selected for the respective bellows segment. The limit disc at one end of the composite seal is adapted to be hermetically connected to a movable actuator rod or shaft and the limit disc at the other end of the composite seal is adapted to be connected to the housing or body which receives the actuator rod.

DESCRIPTION OF THE PRIOR ART

Bellows seals for reciprocating actuator rods or shafts have been previously developed as shown in U.S. Pat. No. 2,196,676, for example. Composite bellows seals including a plurality of bellows seal segments also have been previously developed as shown in U.S. Pat. No. 3,229,067, for example.

BRIEF DESCRIPTION OF THE DRAWINGS

In the drawing:

FIG. 1 is an axial sectional view showing a composite bellows seal of the present invention;

FIG. 2 is a sectional view taken along the line 2—2 of FIG. 1;

FIG. 3a is a sectional view taken along the line 3a—3a of FIG. 1

FIG. 3b is a sectional view taken along the line 3b—3b of FIG. 1;

FIG. 3c is a sectional view taken along the line 3c—3c of FIG. 1;

FIG. 3d is a sectional view taken along the line 3d—3d of FIG. 1;

FIG. 3e is a sectional view taken along the line 3e—3e of FIG. 1;

FIG. 4 is a schematic representation of the bellows seal shown in FIG. 1 when the seal is in retracted position;

FIG. 5 is the schematic representation of FIG. 4 during expansion of the bellows seal and showing one bellows segment fully expanded with other segments in varied stages of expansion.

DESCRIPTION OF THE ILLUSTRATED EMBODIMENT

Referring to FIG. 1 there is shown a composite seal unit 10 as provided by this invention. Unit 10 as shown is installed to hermetically seal the opening between a movable actuator rod or shaft and a housing or chamber 14 which receives rod 12.

Seal unit 10 is seen to include a composite bellows unit 16, later described, which terminates on one end with a mounting flange 18 which may be secured to housing 14 by means of cap screws 20, for example.

A flanged protective guide tube 22 is concentrically mounted about bellows unit 16 and retained by cap screws 20 as shown. FIG. 2 shows breather and lubricant slots 58 defined in tube 22. The purpose of the guide tube 22 is to limit the squirming action of the bellows unit 16 as may be occasioned by movement under pressure. The guide tube guides the outside of the bellows which causes moving contact only on the greatest circumference and lowest stress.

Bellows unit 16 terminates at its other end with a rod seal collar 42 mounted on rod 12 and retained in position by means of a set screw 44, for example. A seal is effected between rod 12 and collar 42 by means of an O-ring 46 disposed around the rod and housed in a circular groove defined within collar 42, for example.

The composite bellows unit comprises a plurality of cylindrical bellows seal segments 24, 26, 28, and 30 as shown. Each end of each seal segment is connected in hermetically sealed relation to an annular retainer or limit disc such as illustrated at 32, 34, 36, 38 and 40. Successive seal segments such as 24 and 26 connected to a common limit disc such as disc 34. The bellows seal segments are connected to the limit discs by means of welds 60, for example.

The seal segments 24-30 may be formed of a plurality of annular plates alternately welded together at the inner and outer circumferences to form bellows as shown in FIG. 1 or alternately may be formed as conventional seamless annular corrugated tubing such as shown in U.S. Pat. No. 2,196,676, for example. The type of bellows seal segment employed and the specific material used in each segment will of course be consonant with the composition, pressure and temperature of the fluids to be retained.

Referring now to FIGS. 2 and 3a–3e taken in view of FIG. 1, a plurality of tie or limit rods 48, 48a – 54, 54a are disposed in parallel relation to the axis of bellows unit 16 along shaft 12 and variously accommodated in slots or inlets formed in the discs 32 – 40. Each rod has a retainer head 56 formed on each end of the rod as shown in FIGS. 1, 2, 4 and 5. As shown in FIG. 2, the rod heads may be fluted to fit closely to rod 12 yet move freely with respect to the rod. The successive pairs of limit discs, discs 32 and 34 for example, have slots defined to accommodate a pair of limit rods 48 and 48a to permit free axial movement of the rods between the limit discs and movement between the limit discs themselves but to retain the limit discs against further separation when the retainer heads are brought into abutment with the discs. The remainder of the discs, discs 36, 38 and 40 for example, have inlets defined to accommodate the limit rods 48 and 48a to permit free axial movement of the rods and the retainer heads 56 past the inlets formed in the discs.

As shown in FIGS. 3a–3e, and schematically in FIGS. 4 and 5, the separation of limit discs 32 and 34 is limited by tie rods 48 and 48a, the separation of discs 34 and 36 is limited by tie rods 50 and 50a, the separation of discs 36 and 38 is limited by tie rods 52 and 52a and the separation of discs 38 and 40 is limited by tie rods 54 and 54a.

It is to be noted that only two tie rods between each pair of limit discs are shown. In large size bellows units three or more tie rods may be used in accordance with the principal as shown. One tie rod may be used in a small bellows unit.

It is also to be noted that bellows unit 16 may be attached in hermetically sealed relation to housing 14 by attaching flange 18 to the housing with a continuous circumferential weld rather than by use of cap screws 20 and by attaching seal collar 42 to actuator rod 12 with a continuous circumferential weld rather than by use of the set screw 44 and O-ring 46.

The operation of bellows unit 16 is best shown in FIGS. 4 and 5. As shown, when rod 12 begins to extend from housing 14, the expansion of the seal segments 26–30 are unimpeded until the heads 56 of a particular tie rod, rod 48 for example, come into abutment with a particular pair of limit discs, discs 32 and 34 for example. Further expansion of the seal segment such as segment 24 thereon stops and further extension of rod 12 transmits tension through tie rod 48 rather than through seal segment 24. The same action occurs throughout the plurality of seal segments as the discs are restrained by the respective tie rods.

FIG. 5 depicts, for illustration only, the full expansion of seal segment 24 while the remainder of the segments are partially expanded. Expansion of the seal segments will be limited only by the tie rods and by the weight, size and strength characteristics of each segment.

The foregoing description and drawing will suggest other embodiments and variations to those skilled in the art, all of which are intended to be included in the spirit of the invention as herein set forth.

That being claimed is:

1. A composite cylindrical bellows seal comprising: a plurality of cylindrical bellows seal segments; each of said seal segments being hermetically connected at each axial end to respective annular limit discs; certain of said limit discs being commonly connected between two successive seal segments to form said composite bellows seal; a plurality of limit rods extending between all of said limit discs and seal segments and parallel to the axis of each said seal segment; and means operatively associated with said limit rods and discs for causing successive contraction or limited expansion of each seal segment.

2. The bellows seal defined in claim 1, wherein the limit disc at one end of said composite seal is adapted to be hermetically connected to a movable member and the limit disc at the other end of said composite seal is adapted to be hermetically connected to a stationary member.

3. The bellows seal defined in claim 1 wherein the limit disc at one end of said composite seal is adapted to be hermetically connected to an axially movable rod and the limit disc at the other end of said composite seal is adapted to be hermetically connected to a housing which receives said rod.

4. The bellows seal defined in claim 1 wherein seal segments and said limit discs are hermetically connected by welding.

5. A composite cylindrical bellows seal comprising: a plurality of cylindrical bellows seal segments; each of said seal segments being hermetically connected at each axial end to respective annular limit discs; certain of said limit discs being commonly connected between two successive seal segments to form said composite bellows seal; limit means extending between all of said limit discs and seal segments; and means operatively associated with said limit means for causing successive contraction and limited expansion of each seal segment.

6. A bellows seal as defined in claim 5 wherein said limit means are disposed within said bellows seal segments and a guide tube is concentrically mounted about said bellows seal to limit lateral movement thereof.

7. The bellows seal defined in claim 5 wherein said limit means comprises tie rods respectively having retaining heads at each end to abut and limit separation of said successive limit discs to a preselected distance.

8. The bellows seal defined in claim 7 wherein said tie rods are disposed parallel to the axis of said seal segments.

9. The bellows seal defined in claim 7 wherein a plurality of said tie rods are connected between said successive limit discs.

10. The bellows seal defined in claim 9 wherein said tie rods are disposed within said bellows seal segments and a guide tube is concentrically mounted about said bellows seal to limit lateral movement thereof.

* * * * *